United States Patent
Gu et al.

(10) Patent No.: US 9,280,714 B2
(45) Date of Patent: Mar. 8, 2016

(54) USER IDENTIFICATION SYSTEM AND METHOD FOR IDENTIFYING USER

(75) Inventors: Ren-Hau Gu, Hsin-Chu (TW); Chih-Yen Wu, Hsin-Chu (TW)

(73) Assignee: PIXART IMAGING INCORPORATION, R.O.C., Hsin-Chin (TW)

( * ) Notice: Subject to any disclaimer, the term of this patent is extended or adjusted under 35 U.S.C. 154(b) by 256 days.

(21) Appl. No.: 13/586,764

(22) Filed: Aug. 15, 2012

(65) Prior Publication Data
US 2013/0243242 A1 Sep. 19, 2013

(30) Foreign Application Priority Data
Mar. 16, 2012 (TW) .............................. 101108990 A (51) Int. Cl.
*G06K 9/00* (2006.01)

(52) U.S. Cl.
CPC ........ *G06K 9/00885* (2013.01); *G06K 9/00355* (2013.01)

(58) Field of Classification Search
CPC . G06K 9/00; G06K 9/00026; G06K 9/00087; G06T 7/204; G06T 7/20; G06T 7/2093
USPC ......................... 382/103, 124, 116
See application file for complete search history.

(56) References Cited

U.S. PATENT DOCUMENTS

| 6,327,376 B1* | 12/2001 | Harkin | G01B 7/004 356/71 |
| 7,447,334 B1* | 11/2008 | Jiang | G06K 9/00362 348/143 |
| 7,809,214 B2* | 10/2010 | Disatnik et al. | 382/313 |
| 2002/0114394 A1* | 8/2002 | Ma | H04N 19/51 375/240.16 |
| 2003/0013463 A1* | 1/2003 | Yen | G06Q 10/10 455/461 |
| 2003/0028784 A1* | 2/2003 | Uchida | G06K 9/00026 713/186 |
| 2003/0208289 A1* | 11/2003 | Ben-Arie | G06F 3/011 700/61 |
| 2004/0140956 A1* | 7/2004 | Kushler | G06F 3/04883 345/168 |
| 2004/0211883 A1* | 10/2004 | Imagawa | G01S 11/14 250/208.1 |
| 2007/0041058 A1* | 2/2007 | Disatnik | G06F 3/0317 358/486 |
| 2008/0134078 A1* | 6/2008 | Han | G06F 3/04883 715/784 |
| 2008/0240523 A1* | 10/2008 | Benkley | G06K 9/00026 382/126 |
| 2009/0087028 A1* | 4/2009 | Lacey | G08B 21/245 382/103 |
| 2009/0110291 A1* | 4/2009 | Matsumura | G06T 7/0075 382/195 |
| 2009/0324011 A1* | 12/2009 | Lin et al. | 382/103 |
| 2010/0194706 A1* | 8/2010 | Watanabe | G06F 3/04847 345/173 |
| 2010/0208949 A1* | 8/2010 | Sato | G06K 9/00885 382/115 |
| 2011/0041100 A1* | 2/2011 | Boillot | G06F 3/011 715/863 |

(Continued)

Primary Examiner — Stephen R Koziol
Assistant Examiner — Shaghayegh Azima
(74) Attorney, Agent, or Firm — Tung & Associates (57) ABSTRACT

The present invention discloses an identification system which includes an image sensor, a storage unit and a comparing unit. The image sensor captures a plurality of images of the motion trajectory generated by a user at different timings. The storage unit has stored motion vector information of a group of users including or not including the user generating the motion trajectory. The comparing unit compares the plurality of images with the motion vector information to identify the user. The present invention also provides an identification method.

26 Claims, 7 Drawing Sheets

(56) References Cited

U.S. PATENT DOCUMENTS

| | | | |
|---|---|---|---|
| 2011/0043475 A1* | 2/2011 | Rigazio | G06F 3/04883 345/173 |
| 2011/0150304 A1* | 6/2011 | Abe | A61B 5/1172 382/124 |
| 2011/0228987 A1* | 9/2011 | Iwasaki | G06T 7/2006 382/107 |
| 2011/0233383 A1* | 9/2011 | Oku | H01L 27/14625 250/208.1 |
| 2011/0317886 A1* | 12/2011 | Matsuoka | G06F 21/32 382/124 |
| 2012/0162081 A1* | 6/2012 | Stark | G06F 3/0202 345/168 |
| 2012/0242622 A1* | 9/2012 | Tseng | G06F 3/0421 345/175 |
| 2012/0254773 A1* | 10/2012 | Viswanathan | G06F 3/0483 715/753 |
| 2012/0278720 A1* | 11/2012 | Yabe | G06F 3/017 715/728 |
| 2012/0306781 A1* | 12/2012 | Hwang | G06F 3/04883 345/173 |
| 2012/0308092 A1* | 12/2012 | Benkley | G06F 3/03547 382/124 |
| 2013/0004031 A1* | 1/2013 | Abiko | G06K 9/00026 382/124 |
| 2013/0036461 A1* | 2/2013 | Lowry | G06F 21/36 726/19 |
| 2013/0104203 A1* | 4/2013 | Davis | H04L 9/3231 726/5 |
| 2015/0078613 A1* | 3/2015 | Forutanpour | G06F 3/017 382/103 |

\* cited by examiner

Fig. 1

The motion trajectory of the finger of user A

Fig. 2A

The motion trajectory of the finger of user B

Fig. 2B

The motion trajectory of the finger of user C

Fig. 2C

The motion trajectory of the finger of user D

Fig. 2D

The motion trajectory of the finger of user E

The motion trajectory of the finger of user A

Fig. 4A

The motion trajectory of the finger of user B

Fig. 4B

The motion trajectory of the finger of user C

Fig. 4C

The motion trajectory of the finger of user D

Fig. 4D

The motion trajectory of the finger of user E

Fig. 7

USER IDENTIFICATION SYSTEM AND METHOD FOR IDENTIFYING USER

CROSS REFERENCE

The present invention claims priority to TW 101108990, filed on Mar. 16, 2012.

BACKGROUND OF THE INVENTION

1. Field of Invention

The present invention relates to an identification system and an identification method; particularly, it relates to an identification system and an identification method for identifying a user.

2. Description of Related Art

Modern commodities are often marketed by self-service machines, such as vending machines, self-guider machines or virtual machines which display goods. To some particular users (e.g., members), it is often required to provide more personalized or customized services, such as good inquiries or special orders. Therefore, a highly accurate and secure user authentication system is required.

The automated teller machine (ATM) is a common example of the user authentication system. On modern ATMs, a user is authenticated and identified by inserting a plastic ATM card and entering the personal password. Using an ATM, a user can access his bank account in order to make cash withdrawals, credit card cash advances, utility payments, and account balance checks.

Other types of self-services, such as access control at home or office, online games, online financial transaction for stocks or futures, management of online bank account, or even self-service laundry, all require the capability for identifying the users, to ensure that the self-service is accessed by an authenticated and authorized user (e.g., a member).

The conventional user authentication system requires a card with a magnetic stripe, such as credit cards, door access cards or ATM cards; however, such cards are susceptible to interference by strong external magnetic field, which leads to malfunction or failure. In addition, once the cards are lost, they are easily misappropriated and the user will suffer financial loss and damage in credit rating. Another inconvenience is that the user is unable to access the self-service if he forgets the password. Therefore, it is desired to provide a highly accurate user authentication system which can provide more personalized and customized self-services without the requirement of any magnetic stripe card or any password, thereby overcoming the drawbacks in the prior art.

SUMMARY OF THE INVENTION

The present invention provides an identification system for accurately identifying a user.

The present invention also provides an identification method, which is applicable in the above-mentioned identification system and possesses the above-mentioned advantages.

Other objectives and advantages of the present invention can be understood from the disclosure of the specification.

To achieve the above and other objectives, from one perspective, the present invention provides an identification system for identifying a user by receiving a motion trajectory generated by the user. The identification system comprises an image sensor, a storage unit and a comparing unit. The image sensor is used for capturing a plurality of images of the motion trajectory generated by the user at different timings. The storage unit is used for storing motion vector information of a group of users including or not including the user generating the motion trajectory. The comparing unit is used for comparing the plurality of images with the motion vector information to identify the user.

In one embodiment, the motion trajectory includes a plurality of motion vectors indicating sequential movements. In one embodiment, each of the motion vectors includes distance information and angle information.

In one embodiment, the identification system further comprises a processing unit for generating the motion vector information of the group of users according to the motion trajectories which are generated in advance by the group of users. In one embodiment, each of the motion trajectories generated by the group of users comprises a plurality of motion vectors indicating sequential movements. In one embodiment, each of the motion vectors generated by the group of users includes distance information and angle information. In one embodiment, the processing unit statistically classifies the distance information and the angle information so as to obtain the individual motion vector information for each user in the group of users.

In one embodiment, the above-mentioned processing unit includes a Support Vector Machine (SVM) classifier, a Principal Component Analysis (PCA) classifier or a Neural Networks (NN) classifier.

In one embodiment, the motion trajectory is a motion trajectory of a part of a hand of the user.

In one embodiment, the identification system further comprises a light transmissive element disposed within a sensible area of the image sensor, wherein the user contacts the light transmissive element to generate the motion trajectory. In one embodiment, the identification system further comprises a light emitting element for providing a light beam, which is disposed at the same side as the image sensor with respect to the light transmissive element, wherein when the user contacts the light transmissive element, the image sensor receives the light beam reflected by the user to capture the plurality of images of the motion trajectory generated by the user at different timings.

From another perspective, the present invention provides an identification method comprising the steps of: capturing a plurality of images of a motion trajectory generated by a user; and comparing the plurality of images with pre-stored motion vector information to identify the user.

In one embodiment, before capturing the plurality of images of the motion trajectory generated by the user, the identification method further comprises: receiving a plurality of images of the motion trajectories generated by a group of users including or not including the user generating the motion trajectory; and generating the motion vector information including individual motion vector information corresponding to each user in the group of users.

In one embodiment, each of the motion trajectories generated by the group of users comprises a plurality of motion vectors indicating sequential movements.

In one embodiment, each of the motion vectors generated by the group of users includes distance information and angle information.

In one embodiment, the identification method further comprises: statistically classifying the distance information and the angle information so as to obtain the individual motion vector information for each user in the group of users.

In one embodiment, before capturing the plurality of images of the motion trajectory generated by the user, the identification method further comprises: judging whether the user contacts an identification system according to a light intensity variation.

From still another perspective, the present invention provides an identification system for identifying a user by receiving a motion trajectory generated by the user. The identification system comprises a trajectory detection unit, a storage unit and a comparing unit. The trajectory detection unit is used for detecting a motion trajectory generated by the user. A storage unit is used for storing motion vector information of a group of users including or not including the user generating the motion trajectory. The comparing unit is used for comparing the motion trajectory with the motion vector information to identify the user.

In one embodiment, the motion trajectory includes a plurality of motion vectors indicating sequential movements.

In one embodiment, each of the motion vectors includes distance information and angle information.

In one embodiment, the identification system further comprises a processing unit for generating motion vector information of the group of users according to the motion trajectories which are generated in advance by the group of users. In one embodiment, each of the motion trajectories generated by the group of users comprises a plurality of motion vectors indicating sequential movements. In one embodiment, each of the motion vectors generated by the group of users includes distance information and angle information. In one embodiment, the processing unit statistically classifies the distance information and the angle information so as to obtain the individual motion vector information for each user in the group of users.

In one embodiment, the trajectory detection unit includes a touch panel.

In view of the above, the identification system of the present invention identifies users by the motion trajectories generated according to their different patterns, so that the sensitivity of the identification is enhanced, wherein the processing unit statistically classifies the distance information and the angle information of the individual motion trajectory for each user in the group of users.

The objectives, technical details, features, and effects of the present invention will be better understood with reference to the detailed description of the embodiments below.

DESCRIPTION OF THE PREFERRED EMBODIMENTS

The above and other technical details, features and effects of the invention will be will be better understood with regard to the detailed description of the embodiments below, with reference to the drawings. In the description, the words relate to directions such as "on", "below", "left", "right", "forward", "backward", etc. are used to illustrate relative orientations in the drawings and should not be considered as limiting in any way.

Figure 1:
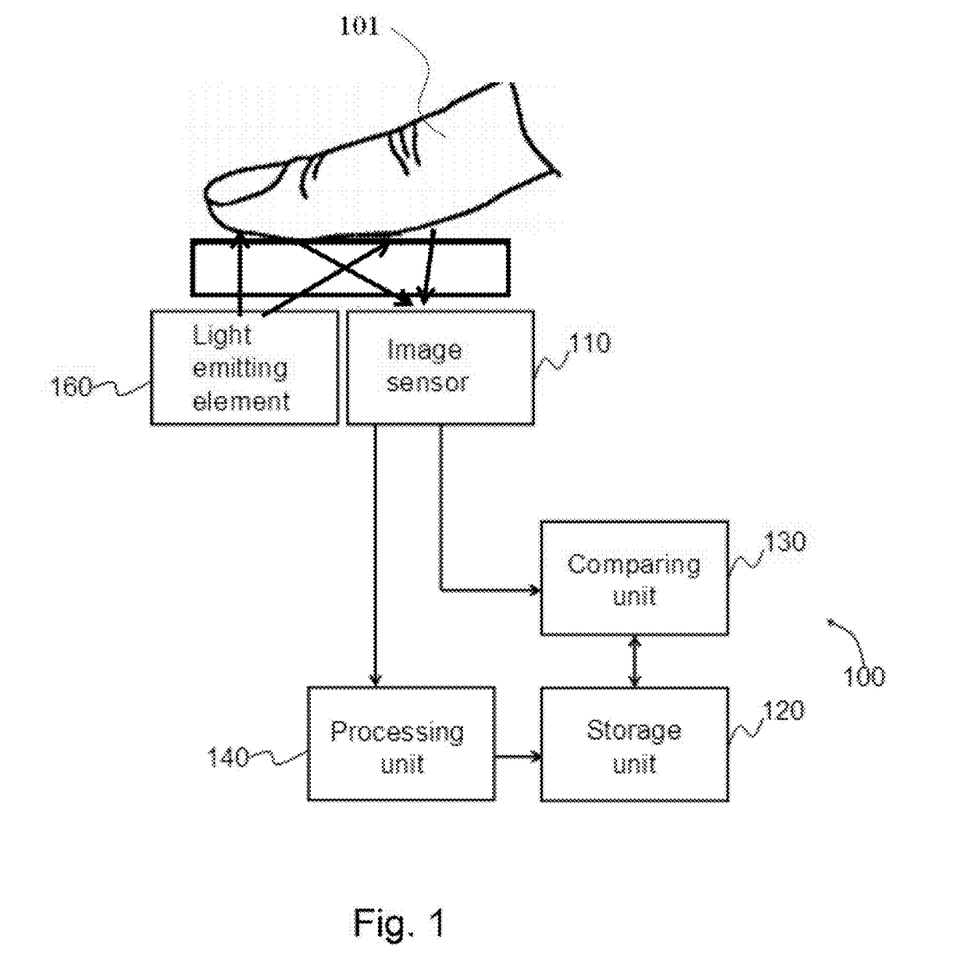
FIG. 1 shows a schematic view of an identification system according to an embodiment of the present invention.
Figure 2A:
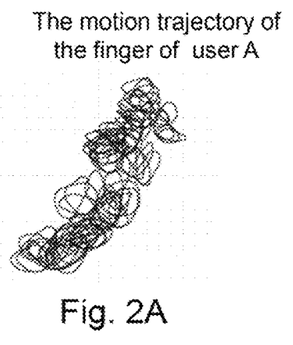
FIGS. 2A-2E show the motion trajectories which are generated in advance by a group of users A-E in the identification system of FIG. 1.
Figure 2B:
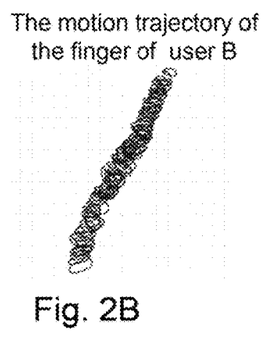
Figure 2C:
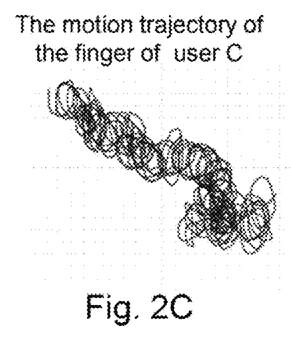
Figure 2D:
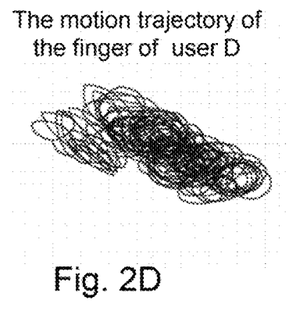
Figure 2E:
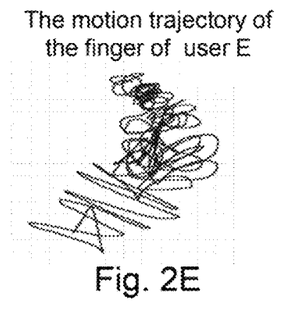
Figure 3:
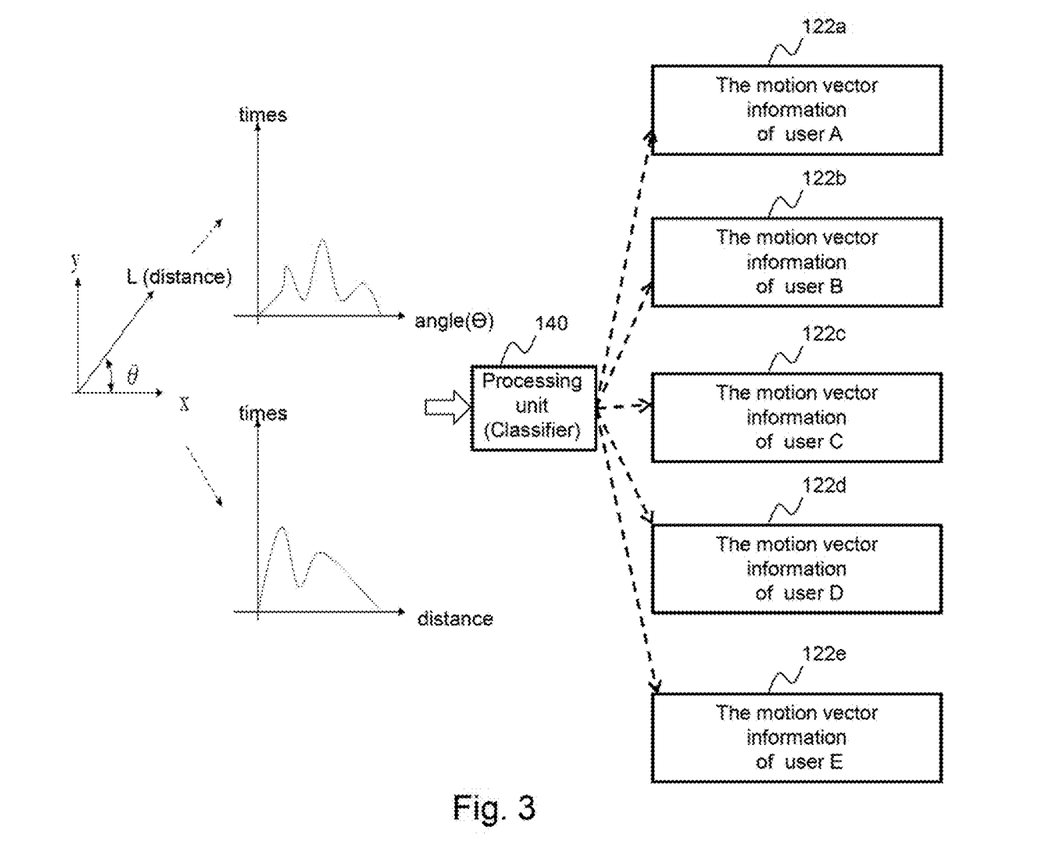
FIG. 3 is a flowchart showing that the processing unit classifies the motion trajectories of FIGS. 2A-2E so as to obtain the individual motion vector information for each of the users A-E.
Figure 4A:
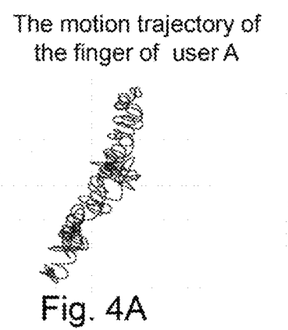
FIGS. 4A-4E show the motion trajectories to be identified, which are generated by the group of users A-E in the identification system of FIG. 1.
Figure 4B:
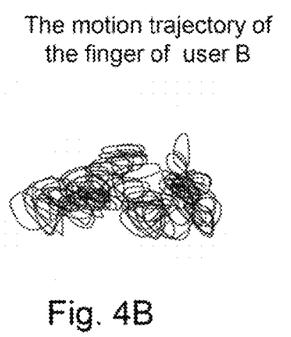
Figure 4C:
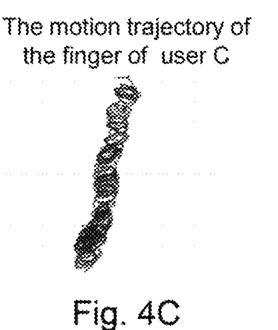
Figure 4D:
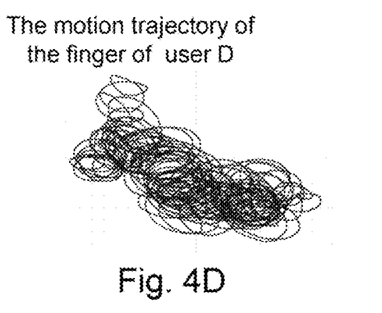
Figure 4E:
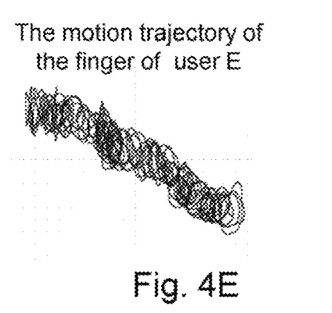

FIG. 1 shows a schematic view of an identification system according to an embodiment of the present invention. FIGS. 2A-2E show the motion trajectories which are generated in advance by a group of users A-E in the identification system of FIG. 1. FIG. 3 is a flowchart showing that the processing unit classifies the motion trajectories of FIGS. 2A-2E so as to obtain the individual motion vector information for each of the users A-E. FIGS. 4A-4E show the motion trajectories to be identified, which are generated by the group of users A-E in the identification system of FIG. 1. Referring to FIG. 1, FIGS. 2A-2E and FIGS. 4A-4E, the identification system 100 comprises an image sensor 110, a storage unit 120 and a comparing unit 130.

The image sensor 110 is used for capturing a plurality of images of the motion trajectory generated by a user to be identified 101 at different timings. The motion trajectory can be generated for example by the user to be identified 101 moving his finger or by the user to be identified 101 moving a handheld device within a sensible area of the image sensor 110. In this embodiment shown in the FIG. 1, the user to be identified 101 moves his finger, but this is for illustrative purpose, not for limiting the scope of the present invention. In this embodiment, the image sensor 110 can be a charge coupled device (CCD), a complementary metal oxide semiconductor image sensor, a webcam, or any other device capable of capturing images.

In this embodiment, the size of the image sensor 110 is smaller than the finger of the user to be identified 101, for example but not limited to 200 μm×200 μm~1500 μm×1500 μm. However, the size of the image sensor 110 can also be larger than the finger of the user to be identified 101, which will be described in detail in another embodiment. More detailedly, when the size of the image sensor 110 is smaller than the finger of the user to be identified 101, the image captured by the image sensor 110 is the image of a part of the finger. When the user moves his finger in a time period, the image sensor 110 captures plural images of the part of the user's finger, and the motion trajectory of the part of the user's finger can be generated by processing these images.

The identification system 100 further comprises a processing unit 140 for generating motion vector information 122a-122e (as shown in FIG. 3) corresponding to respective users in a group of users A-E according to the motion trajectories generated in advance by the group of users A-E (as shown in FIGS. 2A-2E).

To be more specific, each user generates a different motion trajectory because each user has his individual pattern for motion and an individual fingerprint different from others'. For example, if the users A-E are drawing circles to generate motion trajectories (as shown in FIGS. 2A-2E), because each user has his individual fingerprint and his individual pattern for drawing circles, the generated motion trajectories are different one from another. Each of the motion trajectories generated by the group of users A-E comprises a plurality of motion vectors indicating sequential movements, wherein each of the motion vectors includes distance information and angle information. Accordingly, the processing unit 140 of the identification system 100 of this embodiment can statistically classify the distance information and the angle information so as to obtain the individual motion vector information 122a-122e for each user in the group of users A-E (as shown in the flowchart of FIG. 3). In this embodiment, the processing unit 140 is for example a Support Vector Machine (SVM) classifier, a Principal Component Analysis (PCA) classifier or a Neural Networks (NN) classifier.

Next, as shown in FIG. 1 and FIG. 3, the individual motion vector information 122a-122e of all the users in the group of users A-E is stored in a user database (not shown) of a storage unit 120. In this embodiment, the storage unit 120 can be a memory card, a floppy disk, a hard disk, a compact disk (CD), a flash disk, a tape, a network accessible database or any other storage media capable of storing information. The user database is used for storing personal information of the users, such as names, addresses, phone numbers, personal health information, heart rate histories, etc. The user database is preferably in a form which matches the storage and access of the storage unit 120. For example, if the storage unit 120 is a remote data server, the user database may be a cloud database, and the identification system 100 can communicate with the storage unit 120 via wire transmission or wireless transmission so as to retrieve or store the user information in the user database. Certainly, the storage unit 120 can also be an electric device integrated in the identification system 100. The storage unit 120 and its access can be embodied in any way according to practical requirements.

Referring now to FIG. 1, when the user to be identified 101 (e.g., using his finger) approaches to and moves on the identification system 100 of this embodiment, the image sensor 110 of the identification system 100 captures plural images of the motion trajectory generated by the user to be identified 101. The comparing unit 130 compares the images with the motion vector information 122a-122e stored in the storage unit 120 to identify whether the user to be identified 101 corresponds to a user in the group of users A-E. In other words, the identification system 100 identifies a user by receiving a motion trajectory generated by the user within the sensible area of the image sensor 110. The identification system 100 has already had, or can provide or generate the motion vector information 122a-122e corresponding to each user in the group of users A-E. The motion vector information 122a-122e is delivered to the comparing unit 130 (e.g., a Support Vector Machine classifier) for comparison and identification. In this embodiment, the motion vector information 122a-122e is generated by the classification of the processing unit 140 (e.g., any of the above-mentioned classifiers).

Referring to Table 1, the above-mentioned processing unit 140 (the classifier) generates the individual motion vector information 122a-122e for each user in the group of users A-E according to the motion trajectories (as shown in FIGS. 2A-2E) which are generated in advance by the users A-E, and the individual motion vector information 122a-122e is stored in the storage unit 120 as the information for comparison. Next, the motion trajectories as shown in FIGS. 4A-4E are generated by the users A-E, which are the information to be identified and are compared with the pre-stored information for comparison by the comparing unit 130. The percentages of the correct matchings are shown in Table 1. In one embodiment, the information to be identified can be directly compared with the information already classified/trained by the classifier.

TABLE 1

| Pre-stored Information for Comparison | Information to Be Identified | | | | |
|---|---|---|---|---|---|
| | user A | user B | user C | user D | user E |
| user A | 78.79% | 0.00% | 6.06% | 18.18% | 0.00% |
| user B | 6.06% | 93.94% | 6.06% | 9.09% | 3.03% |
| user C | 3.03% | 0.00% | 87.88% | 0.00% | 0.00% |
| user D | 9.09% | 6.06% | 0.00% | 72.73% | 0.00% |
| user E | 3.03% | 0.00% | 0.00% | 0.00% | 96.97% |

As shown in Table 1, the identification system 100 of this embodiment accurately identifies the users from the motion trajectories generated by the users according to the above-mentioned approach.

In a preferred embodiment, the identification system 100 further comprises a light transmissive element 150 disposed within the sensible area of the image sensor, wherein the user to be identified 101 contacts the light transmissive element 150 to generate the motion trajectory as shown in FIGS. 2A-2E or FIGS. 4A-4E. In this embodiment, since the size of the image sensor 110 is smaller than the user's finger, the image sensor 110 will be completely covered. The identification system 100, therefore, further comprises a light emitting element 160 so as to assist generating the image of a part of the finger in the image sensor 110. In this embodiment, the light emitting element 160 provides a light beam L1 and is disposed at the same side as the image sensor 110 with respect to the light transmissive element 150 (as shown in FIG. 1). As such, when the finger of the user to be identified 101 contacts the light transmissive element 150, the image sensor 110 receives the light beam L1 reflected by the user's finger and captures the images of the motion trajectory generated by the user to be identified 101 at different timings. Certainly, the motion trajectory is not limited to being generated by the user's finger; it is also practicable and within the scope of the present invention to generate the motion trajectory by moving a pen or any handheld device on the identification system 100.

Figure 5:
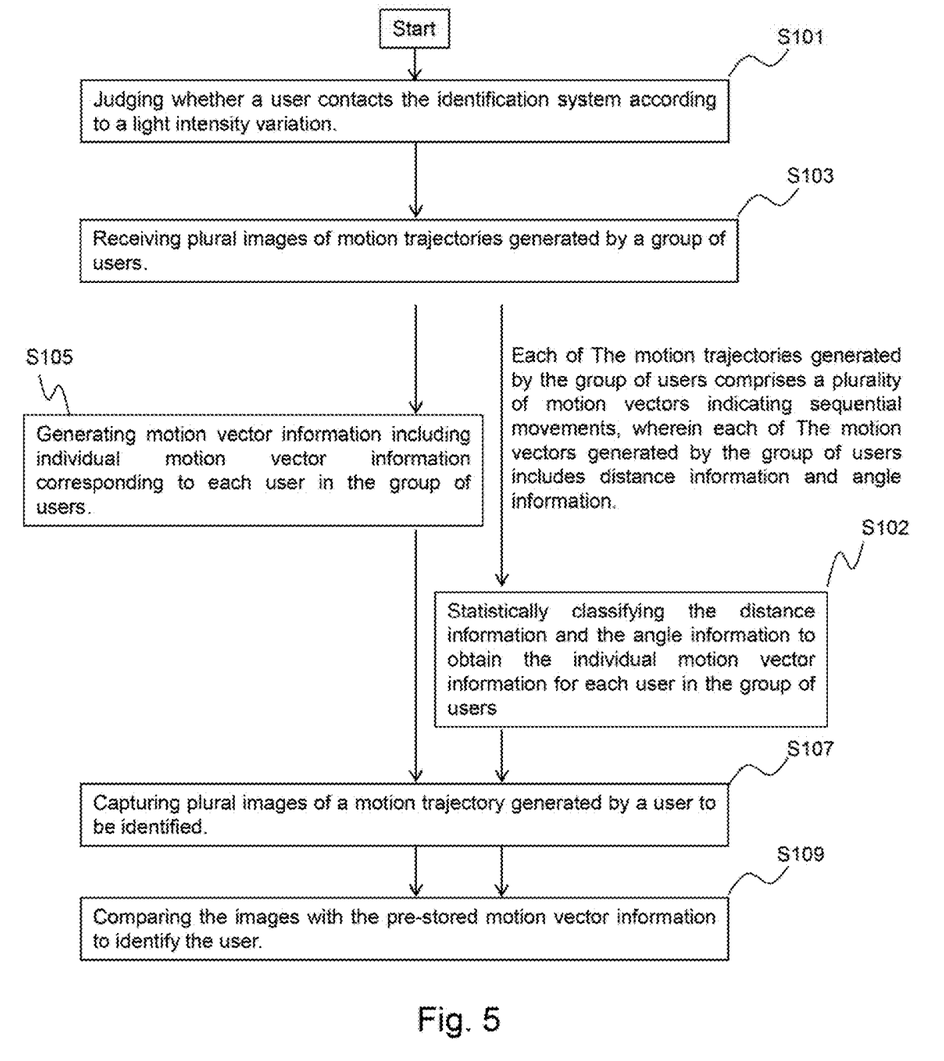
FIG. 5 shows a flowchart of an identification method according to an embodiment of the present invention.

The present invention also provides an identification method as shown in FIG. 5, wherein FIG. 5 shows a flowchart of an identification method according to an embodiment of the present invention. First, as shown in the step S101 of FIG. 5, the identification system judges whether a user contacts the identification system according to a variation in light intensity. Next, as shown in the steps S103 and S105 of FIG. 5, the identification system receives plural images of the motion trajectories generated by the user, and generates the corresponding individual motion vector information; these steps are repeated for a group of multiple users so that the stored motion vector information includes individual motion vector information corresponding to each user in the group of users. Specifically, each of the motion trajectories generated by the group of users comprises plural motion vectors indicating sequential movements, wherein each of the motion vectors generated by the group of users includes distance information and angle information. The identification system statistically classifies the distance information and the angle information to obtain the individual motion vector information for each user in the group of users (as shown in the step S102 of FIG. 5).

Next, as shown in the step S107 of FIG. 5, the identification system captures plural images of a motion trajectory generated by a user to be identified. The group of users may or may not include this user to be identified. Next, as shown in the step S109 of FIG. 5, the identification system compares the images with the pre-stored motion vector information to identify the user.

Figure 6:
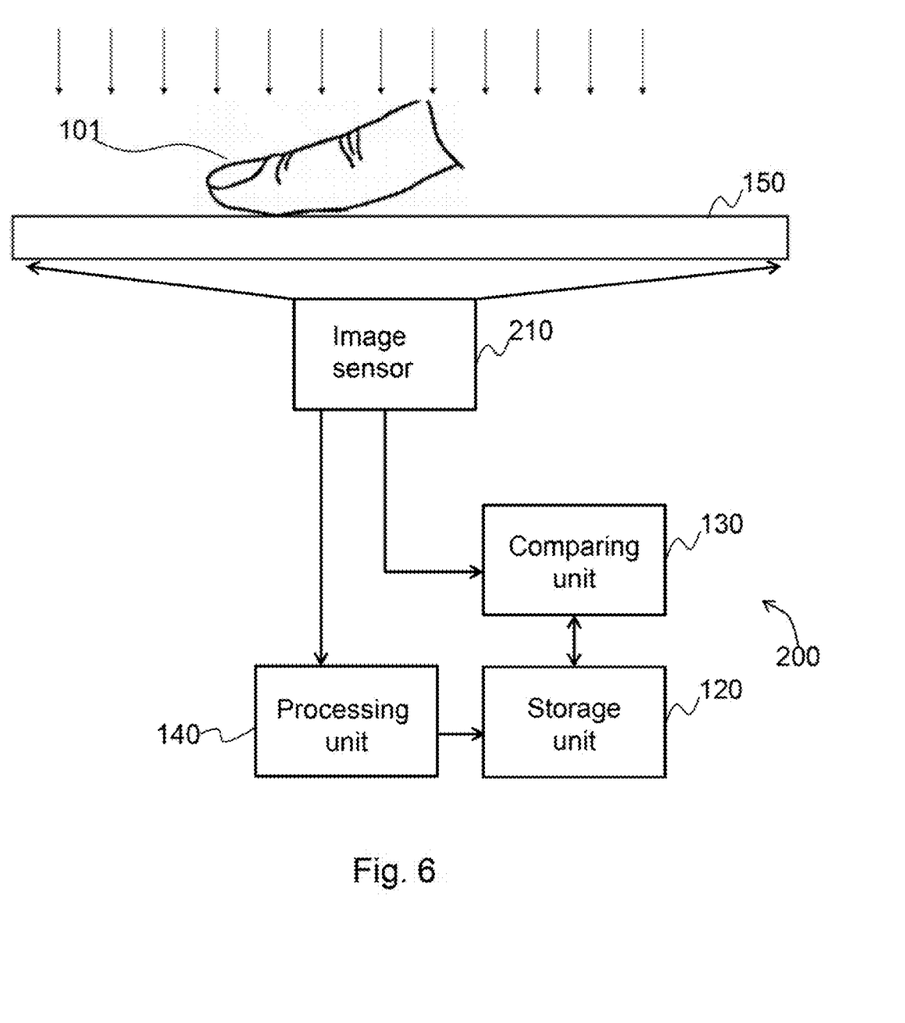
FIG. 6 shows a schematic view of an identification system according to another embodiment of the present invention.

FIG. 6 shows an identification system according to another embodiment of the present invention. Referring both to FIG. 1 and FIG. 6, the identification system 200 of this embodiment is substantially the same as the identification system 100 of the first embodiment, but is different in that the identification system 200 is capable of capturing a complete image area of the user's touch and the motion trajectory generated by the user. That is, the sensible area of the image sensor 210 of this embodiment is larger than the image created by the user. Thus, the identification system 200 of this embodiment needs not comprise the above-mentioned light emitting element 160 of the first embodiment because it is sufficient for the image sensor 210 of this embodiment to receive the external light as a background for capturing the images of the motion trajectory generated by the user.

Likewise, since the identification system 200 pre-stores the individual motion vector information for each user in the group of users, the identification system 200 can identify the user to be identified 101 via comparison executed by the above-mentioned comparing unit 130. The identification system 200 of this embodiment and the identification system 100 of the first embodiment operate according to substantially the same mechanism and algorithm, so they have the substantially the same advantages and the efficacies, which are not redundantly repeated here.

Figure 7:
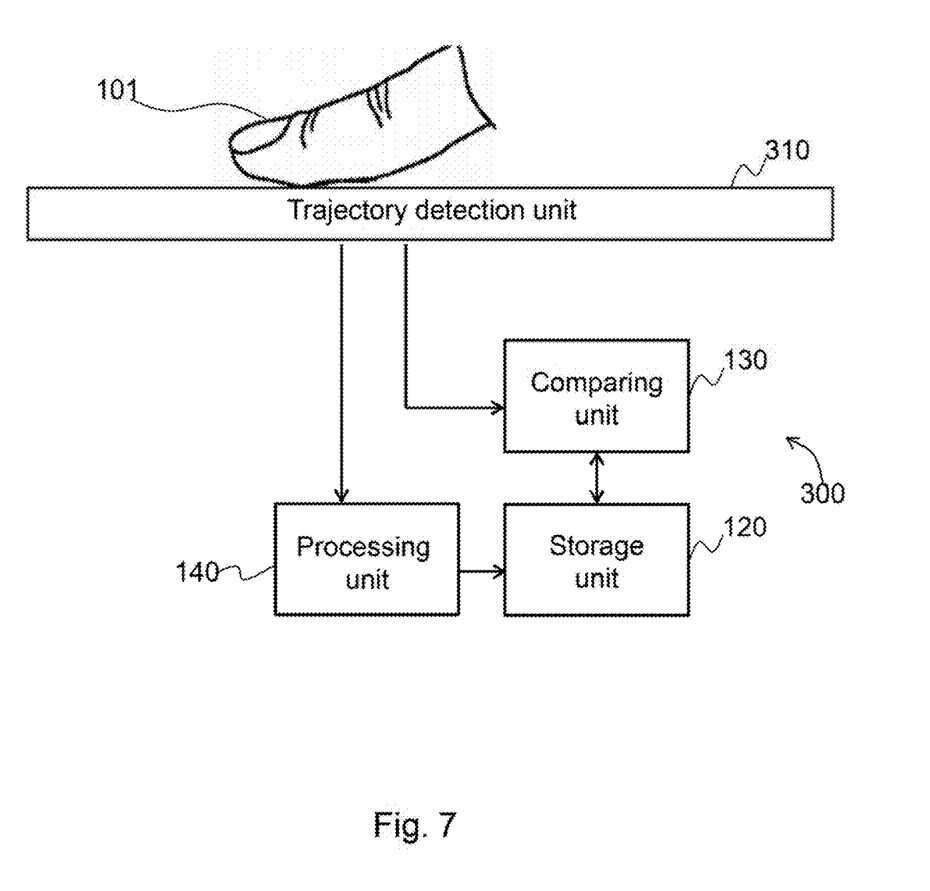
FIG. 7 shows a schematic view of an identification system according to yet another embodiment of the present invention.

FIG. 7 shows an identification system according to yet another embodiment of the present invention. Referring both to FIG. 1 and FIG. 7, the identification system 300 of this embodiment is substantially the same as the identification system 100 of the first embodiment, but is different in that the identification system 300 employs a trajectory detection unit 310 to record the motion trajectory generated by the user, wherein the trajectory detection unit for example can be a touch panel or a touch plate.

In this embodiment, the trajectory detection unit 310 of the identification system 300 is used for detecting the motion trajectories generated by a group of users. The detected motion trajectories can be statistically classified by the above-mentioned processing unit 140 to generate individual motion vector information corresponding to each user in the group of users. The individual motion vector information is stored in the above-mentioned storage unit 120. Thereafter, the trajectory detection unit 310 of the identification system 300 is again used for detecting the motion trajectory generated by the user to be identified 101. Next, the comparing unit 130 compares this motion trajectory with the motion vector information stored in the storage unit 120 to identify the user. Specifically, because the identification system 300 of this embodiment and the identification system 100 of the first embodiment operate according to substantially the same mechanism and algorithm, they have the substantially the same advantages and the efficacies, which are not redundantly repeated here.

It is noteworthy that the identification system 300 of this embodiment is capable of identifying a user according to the motion trajectory of the user's pattern, so it is superior to the conventional mechanism for unlocking a touchscreen because the latter requires a specific action while the present invention functions according to a user's natural habit.

To sum up, the identification system of the present invention is capable of identifying users according to their different patterns for generating motion trajectories, so the sensitivity of the identification is enhanced. In the identification system, the processing unit statistically classifies the distance information and the angle information of the individual motion trajectory for each user. The present invention also provides an identification method which is applicable in the above-mentioned identification system and possesses the above-mentioned advantages.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. In view of the foregoing, the spirit of the present invention should cover all such and other modifications and variations, which should be interpreted to fall within the scope of the following claims and their equivalents.

What is claimed is:

1. An identification system for identifying a user by receiving a motion trajectory generated by the user, the identification system comprising:
   an image sensor for capturing a plurality of images of the motion trajectory generated by the user in a repetitive circular motion;
   a storage unit for storing motion vector information of a group of users including or not including the user generating the motion trajectory, wherein each of the motion vector information includes a trajectory of said repetitive circular motion; and
   a comparing unit for comparing the plurality of images with the motion vector information to identify the user according to a habitual pattern of the user of said repetitive circular motion, so that different users are differentiated according to different habitual patterns.

2. The identification system of claim 1, wherein the motion trajectory includes a plurality of motion vectors indicating sequential movements.

3. The identification system of claim 2, wherein each of the motion vectors includes distance information and angle information.

4. The identification system of claim 1, further comprising:
   a processing unit for generating the motion vector information of the group of users according to the motion trajectories which are generated in advance by the group of users.

5. The identification system of claim 4, wherein each of the motion trajectories generated by the group of users comprises a plurality of motion vectors indicating sequential movements.

6. The identification system of claim 5, wherein each of the motion vectors generated by the group of users includes distance information and angle information.

7. The identification system of claim 6, wherein the processing unit statistically classifies the distance information and the angle information so as to obtain the individual motion vector information for each user in the group of users.

8. The identification system of claim 4, wherein the processing unit includes a Support Vector Machine (SVM) classifier, a Principal Component Analysis (PCA) classifier or a Neural Networks (NN) classifier.

9. The identification system of claim 1, wherein the motion trajectory is a motion trajectory of a part of a hand of the user.

10. The identification system of claim 1, further comprising a light transmissive element disposed within a sensible area of the image sensor, wherein the user contacts the light transmissive element to generate the motion trajectory.

11. The identification system of claim 10, further comprising:
a light emitting element for providing a light beam, which is disposed at the same side as the image sensor with respect to the light transmissive element, wherein when the user contacts the light transmissive element, the image sensor receives the light beam reflected by the user to capture the plurality of images of the motion trajectory generated by the user at different timings.

12. An identification method, comprising:
receiving a plurality of images of the motion trajectories generated by a group of users including or not including the user generating the motion trajectory, wherein each motion trajectory includes a repetitive circular motion;
generating the motion vector information including individual motion vector information corresponding to each user in the group of users;
capturing plurality of images of a motion trajectory generated by a user; and
comparing the plurality of images with pre-stored motion vector information to identify the user according to a habitual pattern of the user of said repetitive circular motion, so that different users are differentiated according to different habitual patterns.

13. The identification method of claim 12, wherein each of the motion trajectories generated by the group of users comprises a plurality of motion vectors indicating sequential movements.

14. The identification method of claim 13, wherein each of the motion vectors generated by the group of users includes distance information and angle information.

15. The identification method of claim 14, further comprising:
statistically classifying the distance information and the angle information so as to obtain the individual motion vector information for each user in the group of users.

16. The identification method of claim 13, wherein before capturing the plurality of images of the motion trajectory generated by the user, the identification method further comprising:
judging whether the user contacts an identification system according to a light intensity variation.

17. An identification system for identifying a user by receiving a motion trajectory generated by the user, the identification system comprising:
a trajectory detection unit for detecting a motion trajectory generated by the user;
a storage unit for storing motion vector information of a group of users including or not including the user generating the motion trajectory, wherein, each of the motion vector information includes a trajectory of said repetitive circular motion; and
a comparing unit for comparing the motion trajectory with the motion vector information to identify the user according to a habitual pattern of said repetitive circular motion, so that different users are differentiated according to different habitual patterns.

18. The identification system of claim 17, wherein the motion trajectory includes a plurality of motion vectors indicating sequential movements.

19. The identification system of claim 18, wherein each of the motion vectors includes distance information and angle information.

20. The identification system of claim 17, further comprising:
a processing unit for generating motion vector information of the group of users according to the motion trajectories which are generated in advance by the group of users.

21. The identification system of claim 20, wherein each of the motion trajectories generated by the group of users comprises a plurality of motion vectors indicating sequential movements.

22. The identification system of claim 21, wherein each of the motion vectors generated by the group of users includes distance information and angle information.

23. The identification system of claim 22, wherein the processing unit statistically classifies the distance information and the angle information so as to obtain the individual motion vector information for each user in the group of users.

24. The identification system of claim 20, wherein the processing unit includes a Support Vector Machine (SVM) classifier, a Principal Component Analysis (PCA) classifier or a Neural Networks (NN) classifier.

25. The identification system of claim 17, wherein the motion trajectory is a motion trajectory of a part of a hand of the user.

26. The identification system of claim 17, wherein the trajectory detection unit includes a touch panel.

* * * * *